United States Patent
Boyle et al.

(10) Patent No.: US 8,315,209 B1
(45) Date of Patent: Nov. 20, 2012

(54) VOIP APPLICATION FOR A LOYALTY PROGRAM

(75) Inventors: Stephen S. Boyle, Lincoln, CA (US); Thang Dao, San Jose, CA (US)

(73) Assignee: Joingo, LLC, San Jose, CA (US)

( * ) Notice: Subject to any disclaimer, the term of this patent is extended or adjusted under 35 U.S.C. 154(b) by 0 days.

(21) Appl. No.: 13/481,816

(22) Filed: May 26, 2012

Related U.S. Application Data

(60) Provisional application No. 61/618,716, filed on Mar. 31, 2012.

(51) Int. Cl.
*H04W 4/00* (2009.01)
*H04B 7/216* (2006.01)
*H04L 12/66* (2006.01)
*G06Q 30/00* (2012.01)

(52) U.S. Cl. ........ 370/328; 370/335; 370/342; 370/356; 705/14.27

(58) Field of Classification Search ................. 705/14.27
See application file for complete search history.

(56) References Cited

U.S. PATENT DOCUMENTS

| | | | |
|---|---|---|---|
| 6,954,526 B1 | 10/2005 | Glenn et al. | |
| 7,844,504 B1 * | 11/2010 | Flockhart et al. | 705/26.1 |
| 8,090,086 B2 | 1/2012 | Chang | |
| 2005/0257196 A1 * | 11/2005 | Hollander et al. | 717/115 |
| 2006/0126818 A1 * | 6/2006 | Berger et al. | 379/265.09 |
| 2007/0036143 A1 | 2/2007 | Alt et al. | |
| 2007/0083441 A1 * | 4/2007 | Harper et al. | 705/26 |
| 2007/0127650 A1 * | 6/2007 | Altberg et al. | 379/114.13 |
| 2008/0040233 A1 * | 2/2008 | Wildman et al. | 705/26 |
| 2008/0095339 A1 | 4/2008 | Elliott et al. | |
| 2008/0205617 A1 | 8/2008 | Sugawara et al. | |
| 2008/0240376 A1 * | 10/2008 | Conway et al. | 379/88.03 |
| 2009/0122728 A1 * | 5/2009 | Aaltonen et al. | 370/259 |
| 2010/0063867 A1 | 3/2010 | Proctor, Jr. et al. | |
| 2011/0243315 A1 | 10/2011 | Lund | |
| 2011/0270662 A1 * | 11/2011 | Rocco | 705/14.27 |
| 2012/0100830 A1 | 4/2012 | Barber et al. | |

* cited by examiner

*Primary Examiner* — Melanie Jagannathan
(74) *Attorney, Agent, or Firm* — Clause Eight IPS; Michael Catania

(57) ABSTRACT

A method and system for providing voice based host services with CRM data without an end user's phone number for loyalty program is disclosed herein. A VoIP application is resident on a mobile communication device of an end user. The VoIP application allows the end user to control how the loyalty program will identify the end user (without the end user's phone number) when the end user requests loyalty program services from the loyalty program using the end user's mobile communication device.

7 Claims, 7 Drawing Sheets

VOIP APPLICATION FOR A LOYALTY PROGRAM

CROSS REFERENCES TO RELATED APPLICATIONS

The present application claims priority to U.S. Provisional Patent Application No. 61/618,716, filed on Mar. 31, 2012, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to voice over internet protocol communications. More specifically, the present invention relates to a method and system for utilizing voice over Internet protocols with a loyalty program.

2. Description of the Related Art

There various loyalty rewards programs which provide members a benefit for spending time or money for services of an enterprise. However, most loyalty rewards programs require a multitude of personal information from members, including a mobile phone number, physical mailing address and/or email address of the member. The loyalty rewards program uses this personal information to deliver coupons and offers to the member. The loyalty rewards program also sells the information to third parties. Further, when the member wants to terminate the relationship, the member is dependent on the loyalty rewards program to remove the member's information from their records. It is virtually impossible to completely unwind the relationship once it has been established. Essentially, the member is dependent on the loyalty program to erase the member's personal information from the program.

Elliott et al, U.S. Patent Publication Number 20080095339 for System And Method For Providing Requested Quality Of Service In A Hybrid Network discloses the transfer of information across the internet utilizing telephony routing information and IP address information. Lund, U.S. Patent Publication Number 20110243315 for a Method And System For Providing Computer-Network Related Information About A Calling Party discloses providing caller identification information to a called party's customer premise equipment.

General definitions for terms utilized in the pertinent art are set forth below.

GSM, Global System for Mobile Communications is a second generation digital cellular network.

Code Division Multiple Access ("CDMA") is a spread spectrum communication system used in second generation and third generation cellular networks, and is described in U.S. Pat. No. 4,901,307.

Long Term Evolution ("LTE") is a next generation communication network.

Interactive voice response ("IVR") is a telephone technology in which a user uses a phone to interact with a database to acquire information.

Short Message Service ("SMS") is text messaging communication using a mobile phone or other device to send messages up to 160 characters in length.

Multimedia messaging service ("MMS") communication is a communication transmitted to and from a mobile phone that includes a multimedia content such as a digital photograph (JPEG), videos, and the like.

A SMS Gateway is used to send text messages with or without a mobile phone, and is used by aggregators to forward text messages to mobile phones.

BLUETOOTH technology is a standard short range radio link that operates in the unlicensed 2.4 gigaHertz band.

Mobile Originated ("MO") is a text message that is sent from a mobile phone.

Mobile Terminated ("MT") is a text message that is sent to a mobile phone.

Mobile App is an application program resident on a mobile device.

Public Switch Telephone Network ("PSTN") is a telecommunication system in which networks are inter-connected to allow telephones to communicate with each other throughout the world.

Telephone Consumer Protection Act ("TCPA") of 1991 restricts the use of SMS text messages received by mobile phones, and SMS messages sent without a consumer's consent can violate the TCPA.

APP is a software application for a mobile phone such as a smart phone.

Hypertext Transfer Protocol ("HTTP") is a set of conventions for controlling the transfer of information via the Internet from a web server computer to a client computer, and also from a client computer to a web server.

Internet is the worldwide, decentralized totality of server computers and data-transmission paths which can supply information to a connected and browser-equipped client computer, and can receive and forward information entered from the client computer.

FTP or File Transfer Protocol is a protocol for moving files over the Internet from one computer to another.

Short message peer-to-peer ("SMPP") is a telecommunications protocol for exchanging SMS messages between SMS peer entities.

Simple object access protocol ("SOAP") is a computer network protocol for exchanging information.

Simple mail transfer protocol ("SMTP") is a delivery protocol for email.

Transfer Control Protocol/Internet Protocol ("TCP/IP") is a protocol for moving files over the Internet.

A SMS aggregator is an entity that provides connectivity with a mobile phone carrier by offering a SMS gateway to send and receive messages and other digital content.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Direct Inward Dialing ("DID") involves a carrier providing one or more trunk lines to a customer for connection to the customer's private branch exchange ("PBX") and a range of telephone lines are allocated to this line.

Voice over Internet Protocol ("VoIP") relates to voice communications (e.g. telephone calls) transmitted over the Internet such as SKYPE call.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

There is a need for a loyalty program in which a member can control the information provided to the loyalty program while still being rewarded for the member's total value to the loyalty program. For example, even if a member never provides a mobile phone number, the number will be revealed through caller-ID if that member calls the loyalty program for loyalty program services. After the first call, the loyalty program will be aware that the number should be associated with the member. Thus, there is a need for a member to control and if necessary prevent access to the member's mobile phone number, while still receiving the level of service equal to the member's total value to the loyalty program. Further, there is a need for loyalty program that has little or no personal information from the member, and when the relationship is terminated, the loyalty program no longer has the member's personal information.

BRIEF SUMMARY OF THE INVENTION

The present invention provides a method and system for a loyalty program that allows a member to control information to the loyalty program while still being rewarded for the member's total value to the loyalty program. The present invention provides a VoIP application that is resident on a member's mobile communication device such as a mobile phone. The VoIP application allows the member to control how the loyalty program will identify the member (without the member's phone number) when the member requests loyalty program services from the loyalty program using the member's mobile communication device. The present invention allows the member to be identified by an application ID associated with the resident application, a device ID based on identification numbers associated with the device other than the phone number, or the member's account number with the loyalty program.

One aspect of the present invention is a method for providing voice based host services with CRM data without an end user's phone number. The method includes accessing a VoIP application on a mobile communication device of an end user. The VoIP application utilizes the end user's loyalty account information for identification with a host device of the loyalty program without additional information from the end user. The method also includes transmitting a VoIP request for a service from a loyalty program host. The method also includes receiving the VoIP request at a router server. The method also includes determining an appropriate host device of the loyalty program host for the VoIP request received from the end user device. The method also includes routing the VoIP request to the appropriate host device of the loyalty program. The method also includes receiving the VoIP request at the appropriate host device and CRM information for the end user from a CRM database of a loyalty server of the loyalty program.

The host device is preferably a mobile communication device such as mobile phone or a tablet computer. Alternatively, the host device is a stationary device such as a desktop computer.

The CRM information is preferably transmitted to the host device with the VoIP request. Alternatively, the CRM information is transmitted separately to the host device and the VoIP request is transmitted separately to the host device.

Alternatively, the VoIP request comprises a CRM account number for the end user, and the host device queries a CRM database with the CRM account number for the end user to obtain CRM information for the end user.

The host device preferably logs the call and contact automatically as a CRM interaction report in the CRM database.

Another aspect of the present invention is a mobile communication device for participating in a loyalty program. The mobile communication includes a mobile resident software application comprising a VoIP endpoint. The VoIP endpoint utilizes the end user's loyalty account information for identification with a host device of the loyalty program without additional information from the end user.

Yet another aspect of the present invention is a loyalty program system utilizing a VoIP application. The system comprises a plurality of mobile communication devices, a loyalty program server, a plurality of host devices for customer service, and a router server. Each of the plurality of mobile communication devices is associated with an end-user. Each mobile communication device comprises a VoIP application resident on the mobile communication device and comprising a VoIP endpoint that utilizes the end user's loyalty account information for identification. The loyalty program server comprises a CRM database with a plurality of VoIP accounts, each of the VoIP accounts is identified by information in the VoIP account of the end user. The router server is in communication with the plurality of host devices, the loyalty program server and each of the plurality of mobile communication devices to receive VoIP requests from the VoIP application of the plurality of mobile communication devices and to determine which host device of the plurality of host devices to transmit the VoIP request to along with transmission of CRM information for an end user from the CRM database of the loyalty server.

Yet another aspect of the present invention is a method for providing voice based host services with CRM data without an end user's phone number. The method includes accessing a VoIP application on a mobile communication device of an end user. The VoIP application utilizes the end user's loyalty account information for identification with a host device of the loyalty program without additional information from the end user. The method also includes transmitting a VoIP request for a service from a loyalty program host. The method also includes receiving the VoIP request at a router server. The method also includes transmitting from the router server to the VoIP application of the end user device a contact number for a host device of the loyalty program host for the VoIP request. The method also includes connecting end user device to the contact number for the host device of the loyalty program. The method also includes receiving the VoIP request at the host device and CRM information for the end user from a CRM database of a loyalty server of the loyalty program.

Yet another aspect of the present invention is a method for providing voice based host services with CRM data without disclosure of an end user's phone number and using a CRM account number. The method includes accessing a VoIP application on a mobile communication device of an end user. The VoIP application utilizes the end user's loyalty account information for identification with a host device of the loyalty program without additional information from the end user. The method also includes transmitting a VoIP request for a service from a loyalty program host. The VoIP request comprises a mobile communication device ID which is not the phone number of the mobile communication device. The method also includes receiving the VoIP request with the device ID at a router server. The method also includes translating the device ID into a CRM account number for the end user. The method also includes determining a host device of the loyalty program host for the VoIP request received from the end user device. The method also includes routing the VoIP request to the host device of the loyalty program. The method also includes receiving the VoIP request at the appropriate host device and CRM information for the end user from a CRM database of a loyalty server of the loyalty program.

Yet another aspect of the present invention is a method for providing voice based host services with CRM data without the use of an end user's phone number, and using an application ID for identification. The method includes accessing a VoIP application on a mobile communication device of an end user. The VoIP application utilizes the end user's loyalty account information for identification with a host device of the loyalty program without additional information from the end user. The method also includes transmitting a VoIP request for a service from a loyalty program host. The VoIP request comprises an application ID, which is associated with the VoIP application resident on the mobile communication device of the end user. The method also includes receiving the VoIP request with the application ID at a router server. The method also includes translating the application ID into a CRM account number for the end user. The method also includes determining a host device of the loyalty program host for the VoIP request received from the end user device. The method also includes routing the VoIP request to the host device of the loyalty program. The method also includes receiving the VoIP request at the appropriate host device and CRM information for the end user from a CRM database of a loyalty server of the loyalty program.

Yet another aspect of the present invention is a method for providing voice based host services with CRM data for an end user without identification of the end user's phone number. The method includes accessing a VoIP application on a mobile communication device of an end user. The VoIP application utilizes the end user's loyalty account information for identification with a host device of the loyalty program without additional information from the end user. The method also includes transmitting a VoIP request for a service from a loyalty program host. The VoIP request comprises a CRM account number for the end user's loyalty account. The method also includes receiving the VoIP request with the CRM account number at a router server. The method also includes determining a host device of the loyalty program host for the VoIP request received from the end user device. The method also includes routing the VoIP request to the host device of the loyalty program. The method also includes receiving the VoIP request at the appropriate host device and CRM information for the end user from a CRM database of a loyalty server of the loyalty program.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
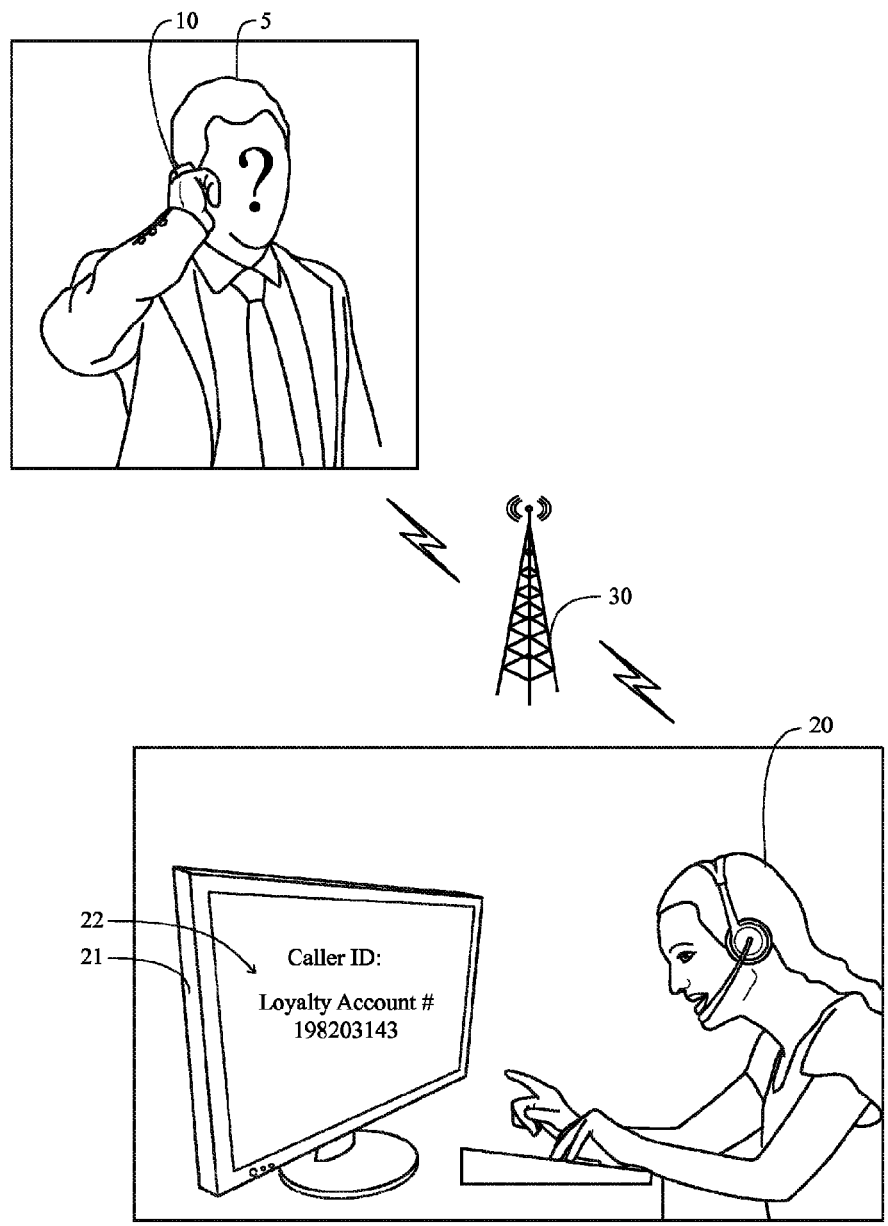
FIG. 1 is a block diagram of a member of a loyalty program using a VoIP application on a mobile phone to make a request for a loyalty program service from a customer service host of a loyalty program, without the member providing his phone number.
Figure 2:
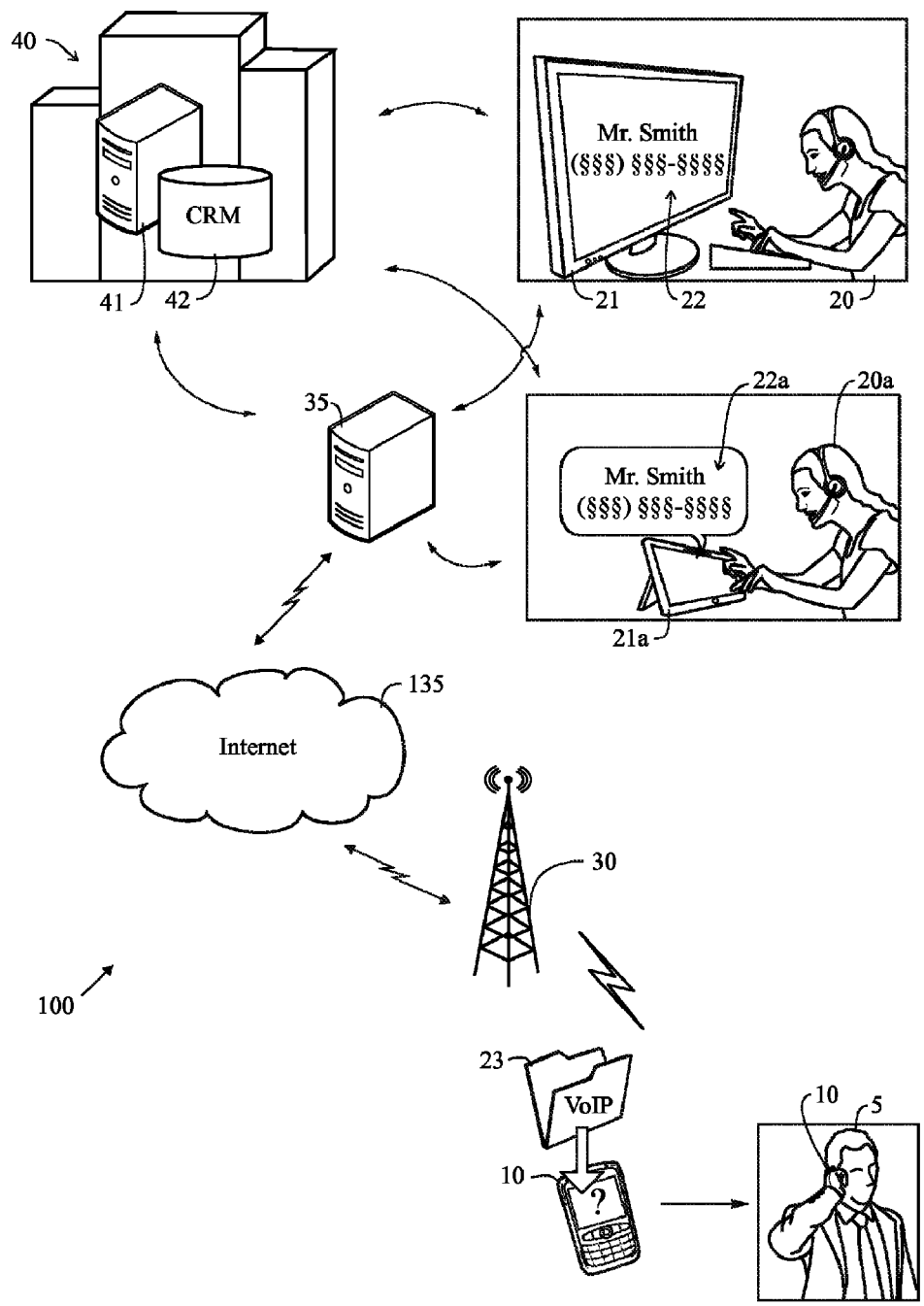
FIG. 2 is a block diagram of a member of a loyalty program using a VoIP application on a mobile phone to make a request for a loyalty program service from a customer service host of a loyalty program, without the member providing his phone number.

As shown in FIGS. 1 and 2, a system for a loyalty program of an enterprise is generally designated 100. The system 100 is preferably comprised of a multiple mobile communication devices, a network, a loyalty program server with a CRM database at an enterprise site, host devices associated with customer services representatives, and a router server.

As shown in FIGS. 1 and 2, a member (end user) 5 of the loyalty program accesses a VoIP application 23 resident on his mobile phone 10 in order to connect to a host device 21 of a customer service representative 20 for the loyalty program over the Internet 135. The member 5 uploads the VoIP application 23 to the member's mobile communication device 10 such that the VoIP application 23 is resident on the mobile communication device 10. Once on the member's mobile communication device 10, the VoIP allows the member 5 to access services for the loyalty program through the VoIP application 23 without providing the phone number associated with the mobile communication device 10. Unlike the prior art, when the member calls, he or she is not inundated with questions from a customer service representative to prove the member's identity. Further, the member's number does not show up on callerID. The invention provides the CRM record 22 or 22a for the member 5 to the customer service representative 20 or 20a through a router server 35 from an enterprise site 40 for a loyalty program which includes a CRM database 42 and an enterprise server 41.

The VoIP application 23 transmits a VoIP request which contains an ID for the member 5. The ID is preferably loyalty program account number for the member. Alternatively, the ID is an application number associated with VoIP application resident on the mobile communication device 10. Alternatively, the ID is a device ID for the mobile communication device, but not the phone number of the mobile communication device 10.

The VoIP application 23 allows the member 5 to have a voice communication with a customer service representative 20 of the loyalty program without disclosing the phone number of the member's mobile communication device 10. Further, the CRM account information for the member 5 is presented to the customer service representative 20 on the host device 21 of the customer service representative during the connection so that the custom service representative 20 is aware of the total value of the member to the loyalty program.

The VoIP request is preferably received at a router server 35. The router server 35 preferably translates the ID associated with the VoIP requests and maps the connection to a host device 21 or 21a of the loyalty program.

The enterprise can be any type of organization that desires to reward customers, engage customers, conduct a mobile marketing campaign or similar mobile marketing program to customers. The enterprise can be a casino and/or resort entity like Harrah's, MGM, Hilton, Starwood, or the like. The enterprise can be a business like Exxon, Apple, Nordstrom or the like. The enterprise can be a non-profit or charity, like the American Red Cross. The enterprise can be a government agency like FEMA. The enterprise can be a political party. The enterprise can be an organization like the American Medical Association. Those skilled in the pertinent art will recognize other types of enterprises that can use the present invention.

The mobile communication devices (host devices) utilized with the present invention preferably include mobile phones, smartphones, tablet computers, PDAs and the like. Examples of smartphones include the IPHONE®smartphone from Apple, Inc., BLACKBERRY® smartphones from Research In Motion, the DROID® smartphone from Motorola Mobility Inc., and many more. Examples of tablet computing devices include the IPAD® tablet from Apple Inc., and the XOOM™ tablet from Motorola Mobility Inc.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 2000 Server, 2003 Server, 2008 Server, Windows Mobile, Linux, Android, Unix, I series, AS 400 and Apple OS.

In VoIP, a digital signal processor segments the voice signal into frames and stores them in voice packets, which are transported using Internet protocol such as H.323, Session Initiation Protocol ("SIP"), Media Gateway Control Protocol, Simple Gateway Control Protocol ("SGCP"), and the like.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP") or other similar protocols. The transmission protocol ranges from SIP to MGCP to FTP and beyond. The protocol at the server is preferably HTTP.

A mobile communication service provider (aka phone carrier) of the customer such as VERIZON, AT&T, SPRINT, T-MOBILE, and the like mobile communication service providers, provide the communication network for communication to the data capable communication device of the customer.

The mobile communication device 10 comprises a VoIP app which has been uploaded to the mobile communication device to reside in a memory of the mobile communication device. In one embodiment, the VoIP app has an ID generator engine for generating an identification code (device ID) for making a VoIP request with the loyalty program. In a preferred method, an applicationID pertains to a single application on a single device. Once the end user (member) deletes the mobile app, the applicationID for that device is rendered invalid and is never valid again. In an alternative method, the device ID is generated based on a UDID number from the mobile communication device and a number associated with the VoIP app. In this manner, a unique identification code is generated for use by the member in participating (voice communications) in the loyalty program without having to disclose a phone number to the loyalty program. The device ID is transmitted to the router server over a network, which accesses the member's account profile in a CRM database of a loyalty server.

On an IPHONE® device from Apple, Inc., the "UDID," or Unique Device Identifier is a combination of forty numbers and letters, and is set by Apple and stays with the device forever.

On an ANDROID based system, one that uses Google Inc.'s ANDROID operating system, the ID is set by Google and created when a user first boots up the device. The ID remains the same unless the user does a "factory reset" of the phone, which deletes the phone's data and settings.

Those skilled in the pertinent art will recognize other identifications, (e.g. MEID) associated with mobile communication devices which can be used to generate a device ID for use by member in making a VoIP request.

Figure 3:
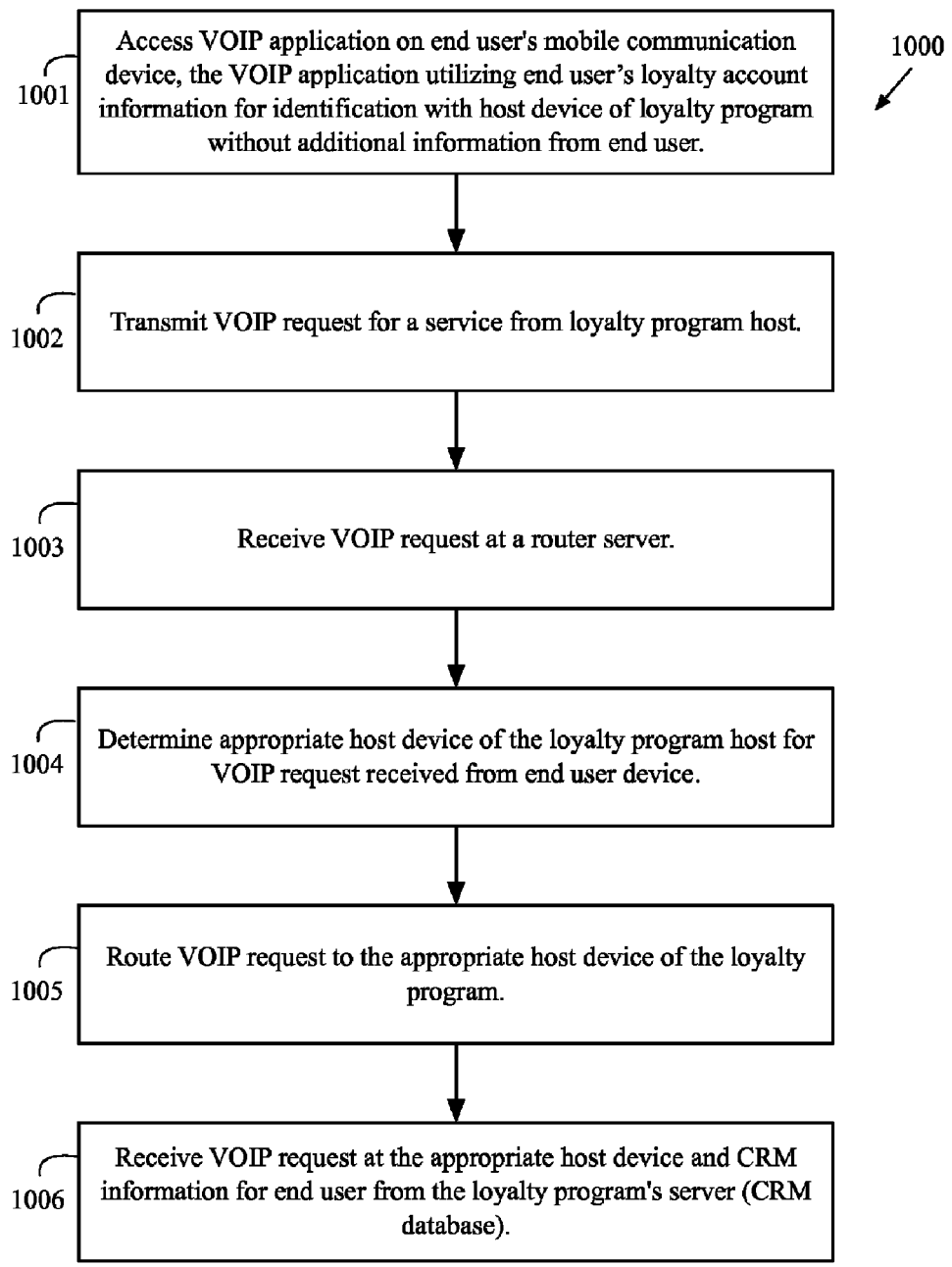
FIG. 3 is a flow chart for a method for providing voice based host services with CRM data for an end user without identification of the end user's phone number.

A flow chart for a general method 1000 for providing voice based host services with CRM data without an end user's phone number is illustrated in FIG. 3. At block 1001, an end user (member of the loyalty program) accesses a VoIP application on a mobile communication device of the end user. The VoIP application utilizes the end user's loyalty account information for identification with a host device of the loyalty program without additional information from the end user. At block 1002, a VoIP request for a service from a loyalty program host is transmitted over a network from the mobile communication device of the end user. At block 1003, the VoIP request from the mobile communication device is received at a router server. At block 1004, an appropriate host device of the loyalty program is determined for the VoIP request received from the end user device. The host device is preferably associated with a customer service representative of the loyalty program that is associated with the level of the total value of the member to the loyalty program. If the member is a high level of total value to the loyalty program, the customer service representative may be a senior vice-president of client relations for the enterprise, and the host device may be the mobile phone of the senior vice-president. At block 1005, the VoIP request is routed to the appropriate host device of the loyalty program. At block 1006, the VoIP request is received at the appropriate host device along with the CRM information for the end user from a CRM database of a loyalty server of the loyalty program.

In the method 1000 of FIG. 3, the CRM information is preferably transmitted to the host device with the VoIP request. Alternatively, the VoIP request and the CRM information are transmitted separately to the host device. Alternatively, the VoIP request comprises a CRM account number for the end user, and the host device queries the CRM database with the CRM account number for the end user to obtain CRM information for the end user. At the end of the call, the host device preferably logs the call and contact automatically as a CRM contact record in the CRM database.

Figure 4:
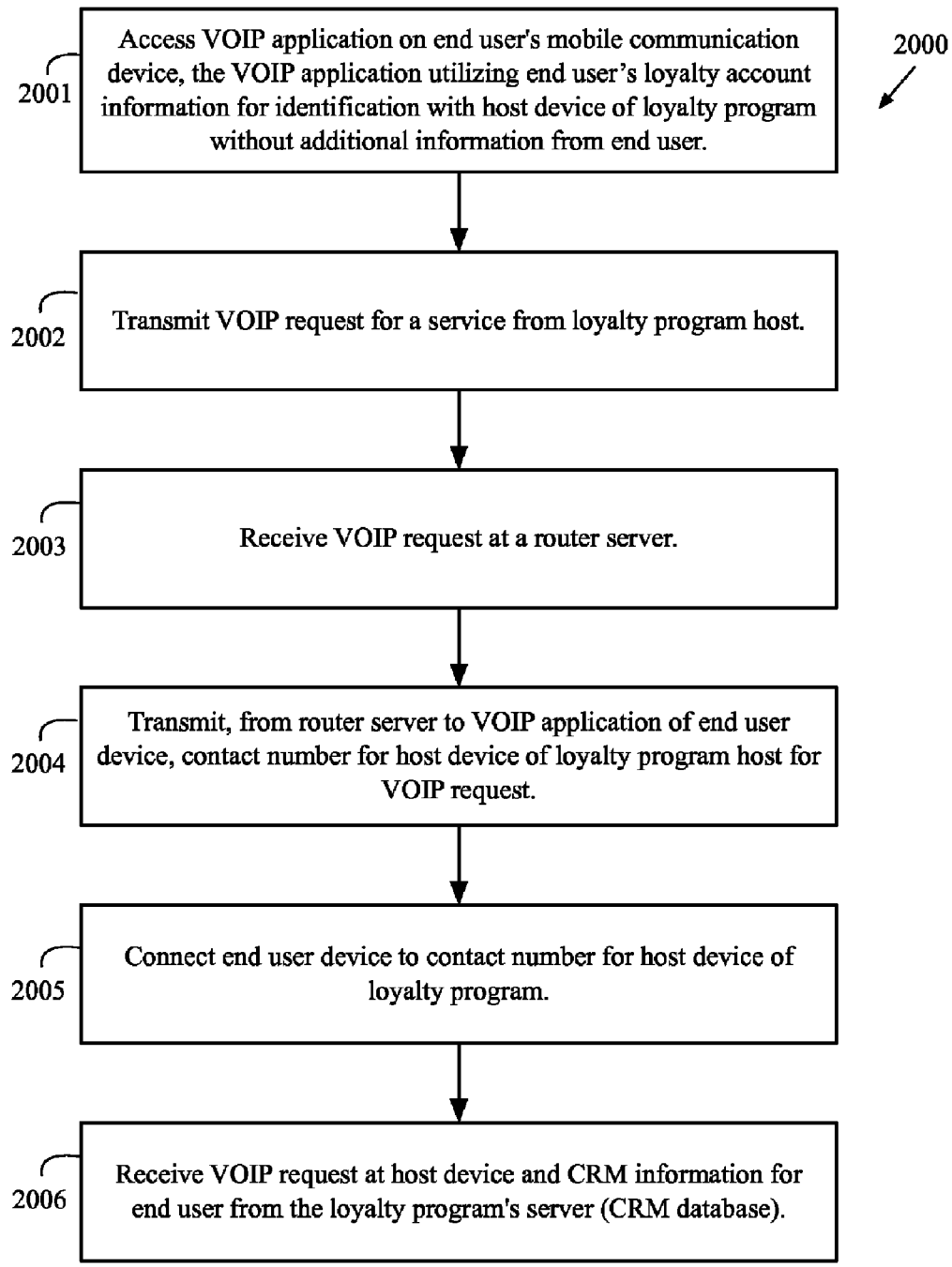
FIG. 4 is a flow chart for a method for providing voice based host services with CRM data for an end user without identification of the end user's phone number.

FIG. 4 is another a flow chart for a method 2000 for providing voice based host services with CRM data without an end user's phone number. At block 2001, an end user accesses a VoIP application on a mobile communication device of the end user. The VoIP application utilizes the end user's loyalty account information for identification with a host device of the loyalty program without additional information from the end user, including without the end user's phone number. At block 2002, a VoIP request for a service from a loyalty program host is transmitted from the mobile communication device of the end user. At block 2003, the VoIP request from the mobile communication device is received at a router server. At block 2004, the router server transmits to the VoIP application of the end user device a contact number for a host device of the loyalty program host for the VoIP request. The router server acts as a directory by determining that a VoIP request from the particular end user should be connected to a specific host device associated with a specific customer service representative of the loyalty program. At block 2005, end user device is connected to the contact number for the specific host device of the loyalty program. At block 2006, the VoIP request (voice communication) is received at the host device along with CRM information for the end user from a CRM database of a loyalty server of the loyalty program. Preferably, the VoIP application of the end user device connects to the host device of the specific customer service representative of the loyalty program for a voice discussion. The customer service representative will also have the CRM account profile information for end user on the host device in order to provide better service to the end user.

In the method 2000 of FIG. 4, the CRM information is preferably transmitted to the host device with the VoIP request. Alternatively, the VoIP request and the CRM information are transmitted separately to the host device. Alternatively, the VoIP request comprises a CRM account number for the end user, and the host device queries the CRM database with the CRM account number for the end user to obtain CRM information for the end user. At the end of the call, the host device preferably logs the call and contact automatically as a CRM contact record in the CRM database.

Figure 5:
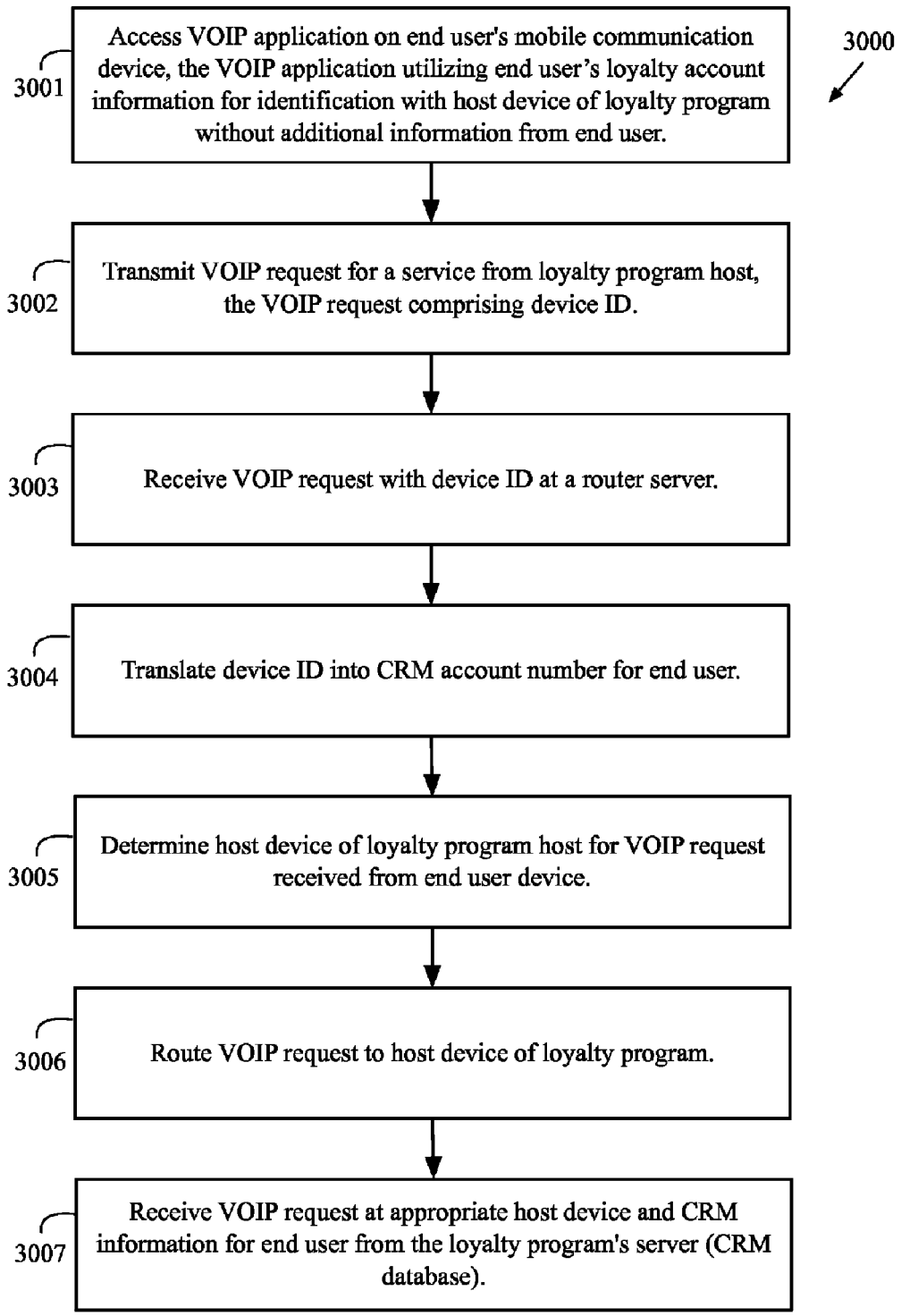
FIG. 5 is a flow chart for a method for providing voice based host services with CRM data for an end user without identification of the end user's phone number.

FIG. 5 is a flow chart for a method 3000 for providing voice based host services with CRM data without disclosure of an end user's phone number and using a CRM account number. At block 3001, an end user accesses a VoIP application on a mobile communication device of the end user. The VoIP application utilizes the end user's loyalty account information for identification with a host device of the loyalty program without additional information from the end user. At block 3002, a VoIP request for a service from a loyalty program host is transmitted from the mobile communication device of the end user. The VoIP request comprises a mobile communication device ID which is not the phone number of the mobile communication device. At block 3003, the VoIP request with the device ID is received at a router server. At block 3004, the device ID is translated at the router server into a CRM account number for the end user. In this manner, the end user's account profile can be retrieved from a CRM database without the end user having o disclose a phone number. At block 3005, a host device of the loyalty program is determined for the VoIP request received from the end user device. The router server preferably determines which customer service representative to route the VoIP request to based on the total value of the end user (member) to the loyalty program. At block 3006, the VoIP request is routed from the router server to the host device of the loyalty program. At block 3007, the VoIP request is received at the appropriate host device along with the CRM information for the end user from a CRM database of a loyalty server of the loyalty program.

In the method 3000 of FIG. 5, the CRM information is preferably transmitted to the host device with the VoIP request. Alternatively, the VoIP request and the CRM information are transmitted separately to the host device. Alternatively, the VoIP request comprises a CRM account number for the end user, and the host device queries the CRM database with the CRM account number for the end user to obtain CRM information for the end user. At the end of the call, the host device preferably logs the call and contact automatically as a CRM contact record in the CRM database.

Figure 6:
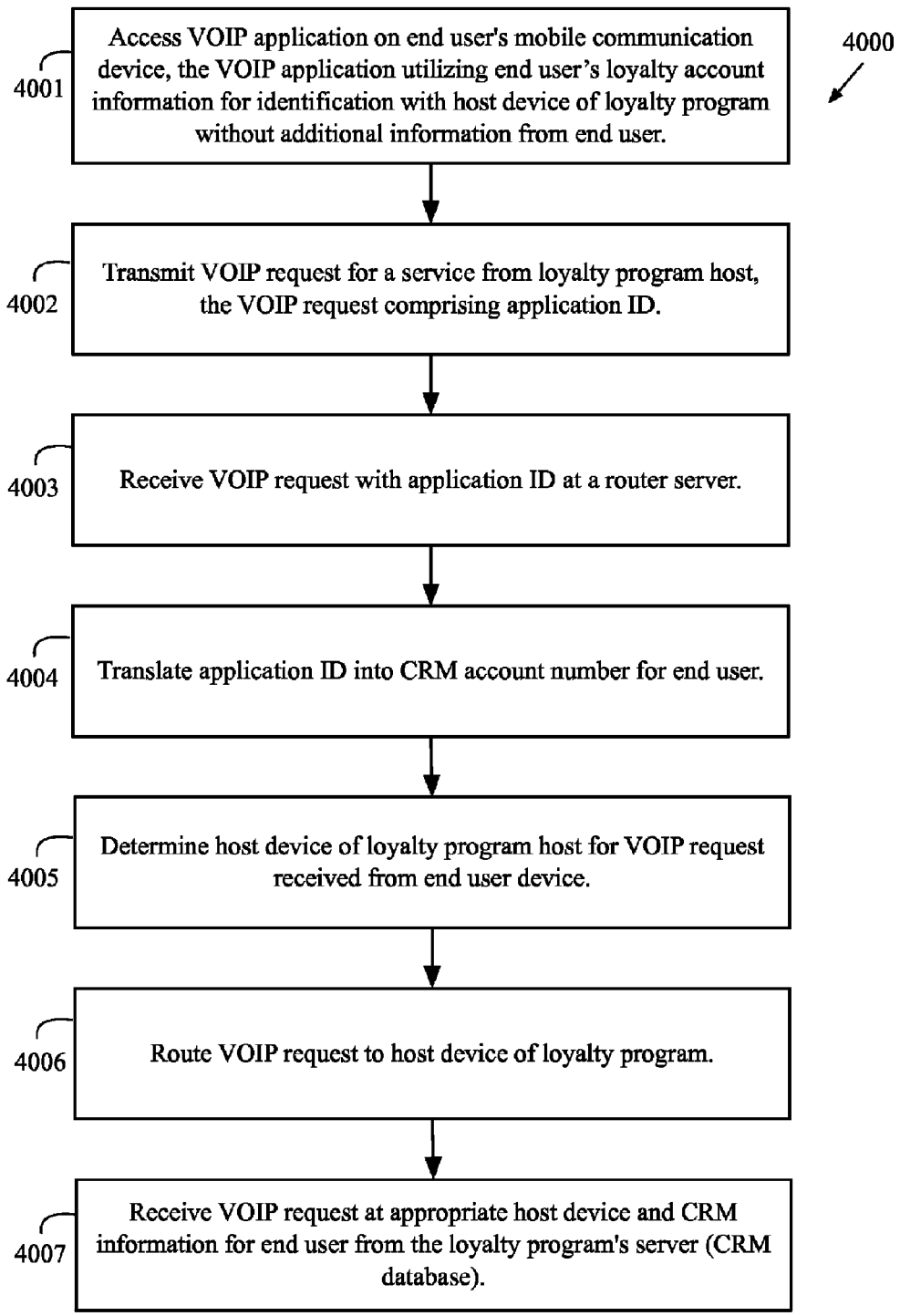
FIG. 6 is a flow chart for a method for providing voice based host services with CRM data for an end user without identification of the end user's phone number.

FIG. 6 is a flow chart for a method 4000 for providing voice based host services with CRM data without the use of an end user's phone number, and using an application ID for identification. At block 4001, an end user accesses a VoIP application on a mobile communication device of the end user. The VoIP application utilizes the end user's loyalty account information for identification with a host device of the loyalty program without additional information from the end user. At block 4002, a VoIP request for a service from a loyalty program host is transmitted from the mobile communication device of the end user. The VoIP request comprises an application ID, which is associated with the VoIP application resident on the mobile communication device of the end user. At block 4003, the VoIP request with the application ID is received at a router server. At block 4004, the application ID is translated at the router server into a CRM account number for the end user. At block 4005, a host device of the loyalty program is determined for the VoIP request received from the end user device. At block 4006, the VoIP request is routed from the router server to the host device of the loyalty program. At block 4007, the VoIP request is received at the appropriate host device along with CRM information for the end user from a CRM database of a loyalty server of the loyalty program.

In the method 4000 of FIG. 6, the CRM information is preferably transmitted to the host device with the VoIP request. Alternatively, the VoIP request and the CRM information are transmitted separately to the host device. Alternatively, the VoIP request comprises a CRM account number for the end user, and the host device queries the CRM database with the CRM account number for the end user to obtain CRM information for the end user. At the end of the call, the host device preferably logs the call and contact automatically as a CRM contact record in the CRM database.

Figure 7:
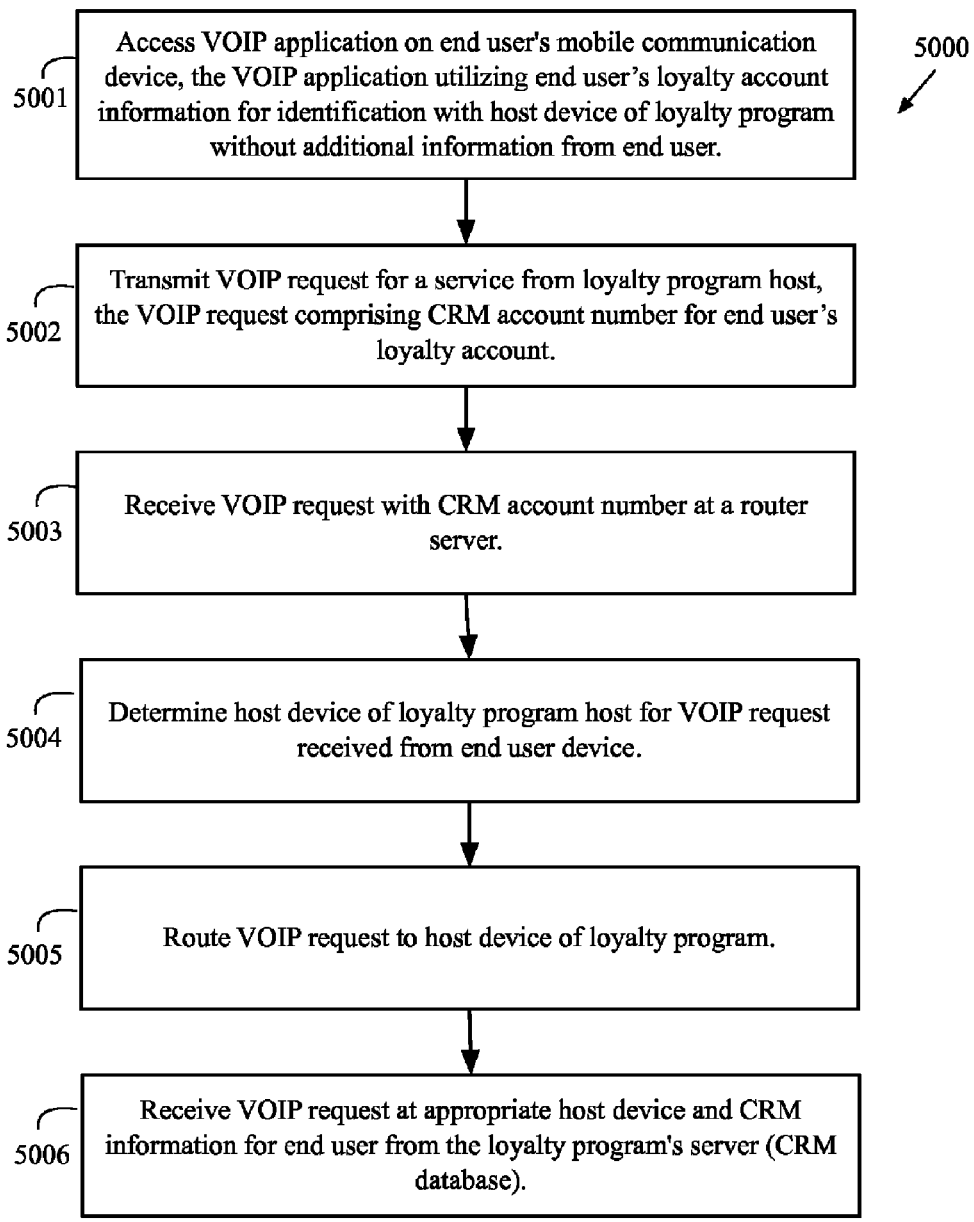
FIG. 7 is a flow chart for a method for providing voice based host services with CRM data for an end user without identification of the end user's phone number.

FIG. 7 is a flow chart for a method 5000 for providing voice based host services with CRM data for an end user without identification of the end user's phone number. At block 5001, an end user accesses a VoIP application on a mobile communication device of the end user. The VoIP application utilizes the end user's loyalty account information for identification with a host device of the loyalty program without additional information from the end user. At block 5002, a VoIP request for a service from a loyalty program host is transmitted from the mobile communication device of the end user. The VoIP request comprises a CRM account number for the end user's loyalty program account. At block 5003, the VoIP request with the CRM account number is received at a router server. At block 5004, a host device of the loyalty program is determined for the VoIP request received from the end user device. At block 5005, the VoIP request is routed from the router server to the host device of the loyalty program. At block 5006, the VoIP request is received at the appropriate host device along with CRM information for the end user from a CRM database of a loyalty server of the loyalty program.

In the method 5000 of FIG. 7, the CRM information is preferably transmitted to the host device with the VoIP request. Alternatively, the VoIP request and the CRM information are transmitted separately to the host device. Alternatively, the VoIP request comprises a CRM account number for the end user, and the host device queries the CRM database with the CRM account number for the end user to obtain CRM information for the end user. At the end of the call, the host device preferably logs the call and contact automatically as a CRM contact record in the CRM database.

In one preferred example, a member of a loyalty program for a casino resort that is a high roller and of great total value to the casino downloads the VoIP application 23 to the member's mobile phone 10. The VoIP application 23, now resident on the mobile phone 10, allows the high roller member to contact a customer representative 20 of the loyalty program of the casino without having to disclose the phone number of the mobile phone 10. The high roller member provides his name and/or loyalty program account number on the VoIP application so that a VoIP request transmitted to a server can map the VoIP application to the member's loyalty account at a CRM database 42 for the casino. The high roller member 5 accesses the VoIP application 23 on the mobile phone 10 which transmits a VoIP request to a router server 35. Essentially, the high roller member is making a telephone call to his loyalty program representative without disclosing his phone number. In this case, the representative is a vice-president of client relations for the casino, and the host device 21 is a mobile phone of the vice president. The router server 35 receives the VoIP request, which includes an ID, as discussed above, which identifies the member. The router server maps the VoIP request, as discussed above, to the mobile phone of the vice-president, along with the account information for the high roller member. In this manner, the vice-president will know the total value of the high roller member to the casino during the conversation, and the high roller will not need to disclose his telephone number.

If the VoIP application 23 is deleted from the mobile communication device 10, or the end user switches devices, the VoIP application 23 and the connection to the loyalty program will be terminated. This benefit allows the member 5 to control the relationship with the loyalty rewards program. The member 5 can terminate the relationship and never be concerned that personal information is still with the rewards program. Once the applicationID is terminated, the relationship is ended until the member again takes affirmative steps to regenerate the relationship. Thus, the present invention empowers the member instead of the loyalty program, and the present invention allows the member to control his or her personal information.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for providing voice based host services with CRM data without an end user's phone number, the method comprising:
    accessing a voice over internet protocol application on a mobile communication device of an end user, the voice over internet protocol application utilizing the end user's loyalty account information for identification with a host device of the loyalty program without additional information from the end user;
    transmitting from the mobile communication device a voice over internet protocol voice call request of the end user for a service from a loyalty program;
    receiving the voice over internet protocol voice call request at a router server;
    determining at the router server an appropriate host device of the loyalty program for the voice over internet protocol voice call request received from the end user device;
    routing the voice over internet protocol voice call request from the router server to the appropriate host device of a customer service representative of the loyalty program; and
    receiving the voice over internet protocol voice call request at the appropriate host device of a customer service representative and CRM information for the end user from a CRM database of a loyalty server of the loyalty program;
    wherein the voice over internet application allows the end user to have a voice communication with a customer service representative of the loyalty program without the phone number of the end-user's mobile communication device.

2. The method according to claim 1 wherein the host device is a stationary device or a mobile communication device.

3. The method according to claim 1 wherein the end user's loyalty account information for identification utilized by the voice over internet protocol application is one of a device ID that does not include the phone number of the mobile communication device, an application ID associated with the voice over internet protocol application that does not include the phone number of the mobile communication device, or a loyalty account number for the end user which does not include the phone number of the mobile communication device.

4. The method according to claim 1 wherein the mobile communication device is a mobile phone or a tablet computer.

5. The method according to claim 1 wherein the CRM information is transmitted to the host device with the voice over internet protocol voice call request, wherein once the relationship between the end user and the loyalty program is terminated, the loyalty program retains no personal information of the end user other than the end user's name.

6. The method according to claim 1 wherein the CRM information is transmitted separately to the host device and the voice over internet protocol voice call request is transmitted separately to the host device.

7. The method according to claim 1 wherein the voice over internet protocol voice call request comprises a CRM account number for the end user, and the host device queries a CRM database with the CRM account number for the end user to obtain CRM information for the end user.

\* \* \* \* \*